(12) United States Patent
Tsunashima

(10) Patent No.: US 8,045,757 B2
(45) Date of Patent: Oct. 25, 2011

(54) IMAGE MONITORING SYSTEM AND OBJECT AREA TRACKING METHOD

(75) Inventor: Nobuhiro Tsunashima, Kanagawa (JP)

(73) Assignee: Sony Corporation (JP)

( * ) Notice: Subject to any disclaimer, the term of this patent is extended or adjusted under 35 U.S.C. 154(b) by 1003 days.

(21) Appl. No.: 11/818,051

(22) Filed: Jun. 12, 2007

(65) Prior Publication Data

US 2008/0002857 A1 Jan. 3, 2008

(30) Foreign Application Priority Data

Jun. 15, 2006 (JP) ................. P2006-165617

(51) Int. Cl.
*G06K 9/00* (2006.01)
*H04N 7/18* (2006.01)

(52) U.S. Cl. ............ 382/103; 382/100; 348/E7.085

(58) Field of Classification Search .......... 382/100, 382/103; 348/E7.085
See application file for complete search history.

(56) References Cited

U.S. PATENT DOCUMENTS

| | | | |
|---|---|---|---|
| 5,912,980 A * | 6/1999 | Hunke | 382/103 |
| 6,236,737 B1 * | 5/2001 | Gregson et al. | 382/103 |
| 6,724,915 B1 * | 4/2004 | Toklu et al. | 382/103 |
| 7,336,803 B2 * | 2/2008 | Mittal et al. | 382/103 |
| 2006/0280335 A1 * | 12/2006 | Tomita et al. | 382/103 |

FOREIGN PATENT DOCUMENTS

| | | |
|---|---|---|
| JP | 62136988 | 6/1987 |
| JP | 6-110552 | 4/1994 |
| JP | 2000105835 | 4/2000 |
| JP | 2001-325672 | 11/2001 |
| JP | 2002157599 | 5/2002 |
| JP | 2004110542 | 4/2004 |
| JP | 2004-282368 | 10/2004 |
| JP | 2006024148 | 1/2006 |

* cited by examiner

*Primary Examiner* — Stephen Koziol
(74) *Attorney, Agent, or Firm* — Lerner, David, Littenberg, Krumholz & Mentlik, LLP

(57) ABSTRACT

An image monitoring system may include an object area detection processing section and an object area tracking processing section. The object area detection processing section may be configured to detect object area information from an image obtained by an input image signal on a basis of the input image signal. The object area tracking processing section may be configured to perform object area tracking processing by associating a current object area with a past object area on a basis of the object area information detected by the object area detection processing section. The object area tracking processing section may associate the current object area with the past object area using unique identifying information. The object area tracking processing section may continue to retain identifying information given to a predetermined object area that has disappeared, and may give the retained identifying information to the predetermined object area when the predetermined object area reappears.

8 Claims, 7 Drawing Sheets

IMAGE MONITORING SYSTEM AND
OBJECT AREA TRACKING METHOD

CROSS-REFERENCE TO RELATED
APPLICATIONS

This application claims priority to Japanese Patent Application No. JP 2006-165617 filed in the Japanese Patent Office on Jun. 15, 2006, the entire content of which is incorporated herein by reference.

BACKGROUND OF THE INVENTION

1. Field of the Invention

The present invention relates to an image monitoring system and an object area tracking method suitable for application to a monitoring system using an ITV camera, for example, and particularly to an image monitoring system and the like that in a tracking process performed by associating a current object area and a past object area with each other using unique identifying information, continue retaining identifying information given to a predetermined object area that has disappeared and give the retained identifying information to the predetermined object area when the predetermined object area reappears. The identifying information can be maintained even when the object area temporarily disappears because the object area is overlapped or hidden, and thus object tracking performance is improved.

2. Description of the Related Art

Technology of detecting objects such as people, cars and the like in an image taken by an ITV (Industrial TV) camera or the like is very important in constructing an image monitoring system. For example, when the technology is applied to a monitoring system using an ITV camera, the construction of the system is considered which takes an image of a place desired to be monitored, such as an off-limits area or the like, by a camera, detects whether an object is present in the image, and generates an alarm when an object enters. In addition, at a place where a large number of people enter and leave a department store or a railway station, a flow of the people is surveyed by tracking the moving people. Thus, the technology can be applied also to regulation of a flow of people, market research and the like.

To detect a moving object in an image may require two processes as shown in FIG. 7. First, an object area detecting process is performed on the basis of an input image signal to detect information on an object area (current object area) from an image based on the input image signal. Next, in an object area tracking process, the current object area and a past object area are associated with each other, and object area information (size, position, traveling velocity, identifying number and the like) is output. The identifying number constitutes unique identifying information. By performing these processes, it is possible to detect a moving object present in an image.

As the object area detecting process, there is a method of comparing an input image (current image) and a past image with each other and thereby detecting a change area as an object area, as described in Japanese Patent Laid-Open No. Hei 6-1100552 referred to as Patent Document 1, for example. This kind of method is generally referred to as inter-frame difference processing.

In addition, as the object area detecting process, there is for example a method described in C. Stuffer, W. E. L Grimson "Adaptive background mixture models for real-time tracking". This method generates a background image that does not include an object area, compares the background image with an input image, and thereby detects the object area. This kind of method is generally referred to as background difference processing.

Further, as the object area detecting process, a processing method as a combination of the inter-frame difference processing and the background difference processing as described above has been proposed. The method is described in Japanese Patent Laid-Open No. 2004-282368 referred to as Patent Document 2, for example. By using such processes, an object area in an input image can be detected. This process first determines a size, a position and the like of information on the object area.

The object area tracking process tracks the object area by associating a current object area and a past object area detected from images based on an input image signal with each other, and gives a unique identifying number to the object area being tracked. There is a method as follows for the association. For example, an object area tracking process disclosed in Japanese Patent Laid-Open No. 2001-325672 referred to as Patent Document 3 evaluates correlation between an object area detected in a current image and an object area detected in a past image using size, position and the like, and associates object areas having a highest evaluation value with each other.

SUMMARY OF THE INVENTION

The tracking process as the conventional method described in Patent Document 3 or the like can fail in tracking an object when the object is overlapped or hidden. FIG. 8 shows an example in which two objects temporarily overlap each other, that is, an example in which two objects existing at a time t−1 overlap each other at time t, and are separate from each other again at time t+1. In this example, when a tracking process is performed using the conventional method, identifying numbers may be given as shown in FIG. 9.

When there are object areas having an identifying number 1 and an identifying number 2 at a time t−1, only one object area existing at time t is associated with the object area having the identifying number 1. As a result, at time t, only the object area having the identifying number 1 exists, and information on the object area having the identifying number 2 is lost. Thus, when the object area having the identifying number 2 is separated again at time t+1, the separated object area is given a new identifying number 3. Although the object areas having the identifying number 2 and the identifying number 3 are associated with an identical object, the object areas are given different identifying numbers. In this case, a correct history of movement of the object area may not be obtained.

FIG. 10 shows an example in which an object is hidden, that is, an example in which an object area at time t−1 is hidden by another object at time t and reappears at time t+1. In this example, when a tracking process is performed using the conventional method, an identifying number is given as shown in FIG. 11. When there is an object area having an identifying number 1 at a time t−1, only one object area existing at time t is associated with the object area having the identifying number 1.

However, the object area given the identifying number 1 at time t is changed greatly in size as compared with the object area given the identifying number 1 at time t−1. That is, at time t, the object area given the identifying number 1 has substantially disappeared. Thus, when the object area reappears at time t+1 after being hidden, the object area is given a new identifying number 2. Although the object areas having the identifying number 1 and the identifying number 2 are associated with an identical object, the object areas are given different identifying numbers. In this case, a correct history of movement of the object area may not be obtained.

It is accordingly desirable to maintain identifying information even when an object area temporarily disappears because the object area is overlapped or hidden, and thereby improve object tracking performance.

A concept of the present invention lies in an image monitoring system which may include an object area detection processing section configured to detect object area information from an image obtained by an input image signal on a basis of the input image signal; and an object area tracking processing section configured to perform object area tracking processing by associating a current object area with a past object area on a basis of the object area information detected by the object area detection processing section; wherein the object area tracking processing section associates the current object area with the past object area using unique identifying information, and the object area tracking processing section continues retaining identifying information given to a predetermined object area that has disappeared, and gives the retained identifying information to the predetermined object area when the predetermined object area reappears.

In the present invention, on the basis of an input image signal, object area information may be detected from an image obtained by the input image signal. Then, object area tracking may be performed by associating a current object area with a past object area on the basis of the detected object area information. In this case, the current object area and the past object area may be associated with each other using unique identifying information, for example a unique identifying number.

In the object area tracking process, when a predetermined object area disappears, identifying information given to the predetermined object area may continue to be retained. The retention of the identifying information may be performed by reproducing information on the predetermined object area, for example. Then, when the predetermined object area reappears, the retained identifying information may be given to the predetermined object area.

For example, the disappearance of the predetermined object area may occur when the predetermined object area overlaps another object area. When the information on the predetermined object area is not detected, it may be determined that the predetermined object area has disappeared.

In addition, for example, the disappearance of the predetermined object area may occur when a part of the predetermined object area is hidden. In this case, while the information on the predetermined object area is detected, when the information is changed greatly from information on a past object area associated with the predetermined object area, it may be determined that the predetermined object area has disappeared.

Thus, the identifying information given to the predetermined object area that has disappeared may continue to be retained, and when the predetermined object area reappears, the retained identifying information may be given to the predetermined object area. It is therefore possible to maintain identifying information even when an object area temporarily disappears because the object area is overlapped or hidden, and thereby improve object tracking performance.

Incidentally, when the predetermined object area disappears as described above, information such for example as a size, position and the like on the predetermined object area when the predetermined object area reappears may be predicted on the basis of the information on the past object area associated with the predetermined object area. Whether the predetermined object area has reappeared may be determined referring to the predicted object area information. It is thus possible to determine the reappearance of the predetermined object area with high accuracy, and improve accuracy in maintenance of identifying numbers.

The retention of the identifying information associated with the predetermined object area that has disappeared may be stopped on certain conditions. For example, for each frame, a position where the predetermined object area will reappear may be predicted on the basis of information on a past object area associated with the predetermined object area, and when the predicted position is outside an image, the retention of the identifying information may be stopped. In addition, for example, for each frame, a position where the predetermined object area will reappear may be predicted on the basis of information on a past object area associated with the predetermined object area, and the retention of the identifying information may be stopped when the predetermined object area has not reappeared at the predicted position within a period corresponding to a predetermined number of frames.

Thus, by stopping the retention of identifying information on certain conditions, a need for a process of for example predicting a reappearance position of a predetermined object area, which takes place because the identifying information is retained, is eliminated, so that a processing load can be reduced.

According to an embodiment of the present invention, in the tracking process associating a current object area with a past object area using common identifying information, identifying information given to a predetermined object area that has disappeared may continue to be retained. When the predetermined object area reappears, the retained identifying information may be given to the predetermined object area. It is therefore possible to maintain the identifying information even when the object area temporarily disappears because the object area is overlapped or hidden, and thereby improve object tracking performance.

DETAILED DESCRIPTION

Figure 1:
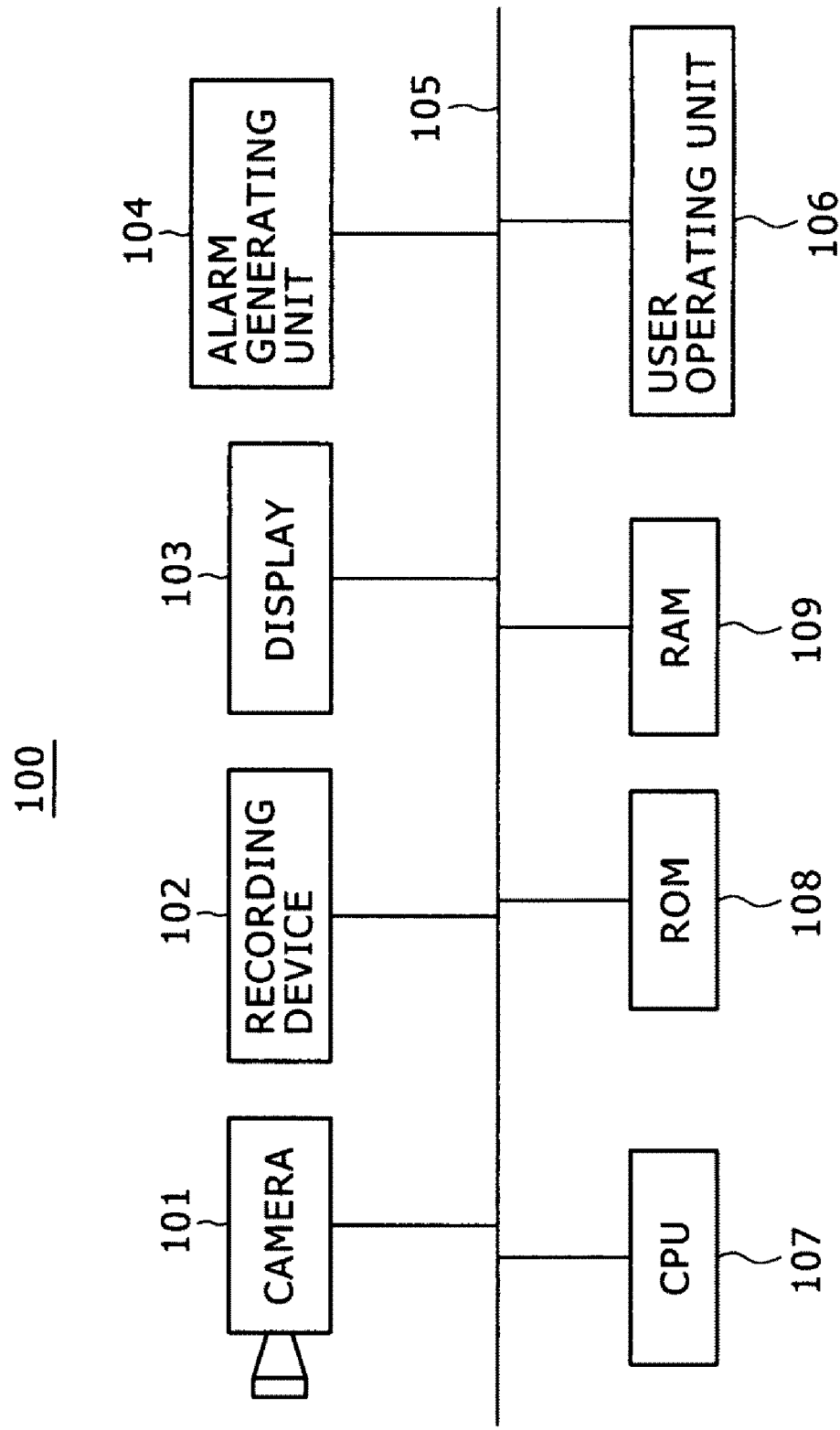
FIG. 1 is a block diagram showing a configuration of an image monitoring system according to an embodiment.

Preferred embodiments of the present invention will hereinafter be described with reference to the drawings. FIG. 1 shows a configuration of an image monitoring system 100 according to an embodiment. This image monitoring system 100 is formed by connecting each of a camera 101, a recording device 102, a display 103, an alarm generating unit 104, a user operating unit 106, a CPU (Central Processing Unit) 107, a ROM (Read Only Memory) 108, and a RAM (Random Access Memory) 109 to a bus 105.

The camera 101 is an ITV camera, for example. The recording device 102 stores an image signal obtained by photographing by the camera 101, information on an object area which information is obtained by an object area tracking process in an image processing unit to be described later, and the like. The recording device 102 is formed by for example an HDD (Hard Disk Drive), a semiconductor memory or the like.

The display 103 displays an image based on an image signal obtained by image pickup by the camera 101, an image based on an image signal reproduced from the recording device 102, an object tracking image processed on the basis of object area information recorded in the recording device 102, and the like. The display 103 is formed by for example an LCD, a CRT, or the like.

The alarm generating unit 104 for example generates an alarm under control of the image processing unit to be described later when an alarm is needed on the basis of object area information obtained by the object area tracking process in the image processing unit and the like. For example, when a predetermined object enters an area where trespassing is prohibited, the alarm generating unit 104 generates an alarm.

The user operating unit 106 forms a user interface for a user to perform various operations on the image monitoring system 100. The user operating unit 106 is formed by for example a keyboard, a mouse and the like.

The CPU 107 controls operation of the whole of the image monitoring system 100. The ROM 108 stores a control program for controlling the operation of the CPU 107, and the like. The RAM 109 functions as a working area for the CPU 107 or the like. The CPU 107 reads the control program stored in the ROM 108 as occasion demands, transfers the read control program to the RAM 109, and then expands the control program. Then, the CPU 107 reads and executes the control program expanded in the RAM 109 to thereby control each part of the image monitoring system 100.

Figure 2:
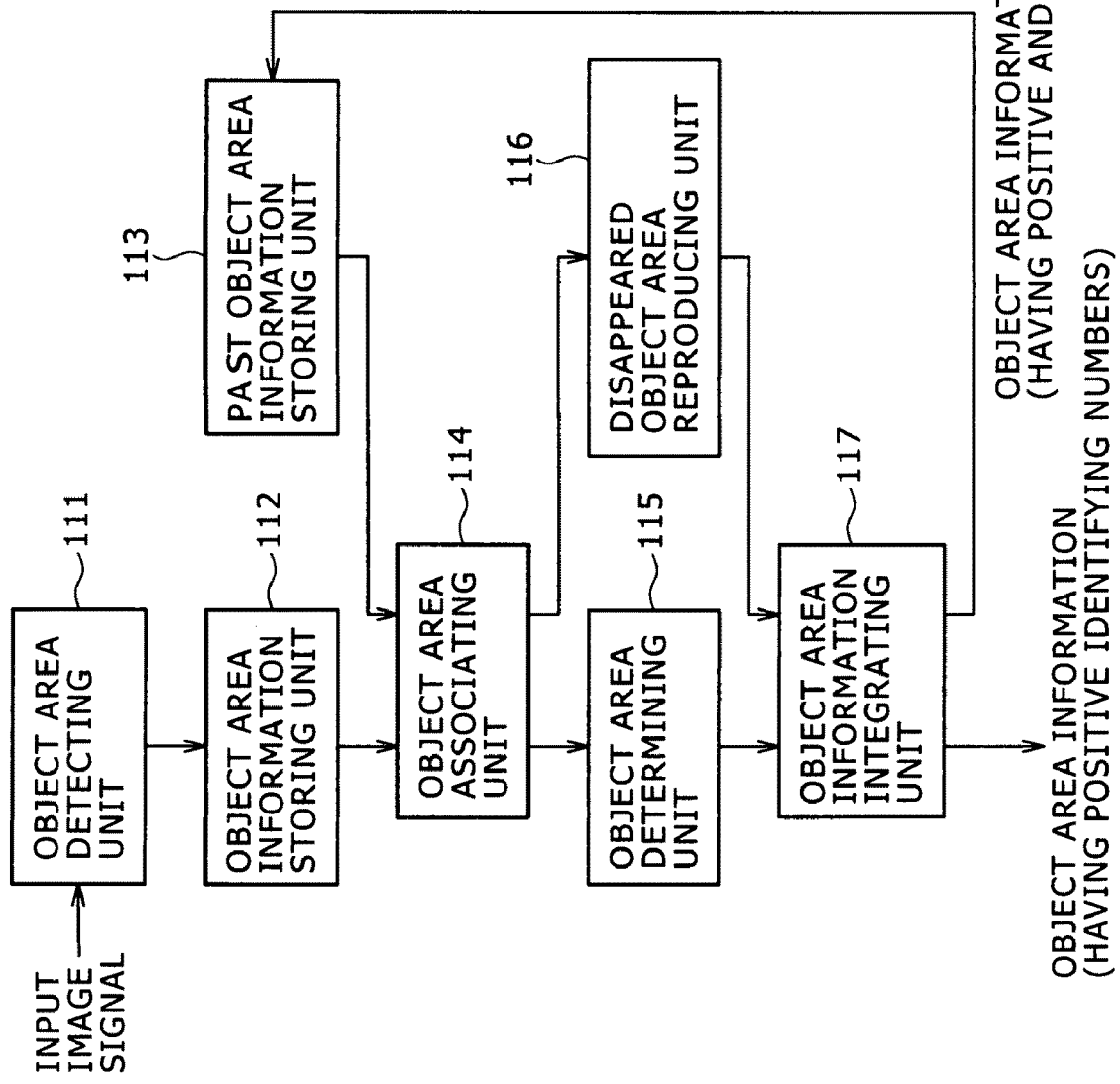
FIG. 2 is a block diagram showing functional blocks of an image processing unit performing an object area detecting and tracking process.

The CPU 107, the ROM 108, and the RAM 109 form the image processing unit that performs an object area detecting process for detecting a moving object in images and an object area tracking process. FIG. 2 shows functional blocks forming the image processing unit. The image processing unit includes an object area detecting unit 111, an object area information storing unit 112, a past object area information storing unit 113, an object area associating unit 114, an object area determining unit 115, a disappeared object area reproducing unit 116, and an object area information integrating unit 117.

On the basis of an image signal (input image signal) obtained by image pickup by the camera 101, the object area detecting unit 111 detects information on an object area (current object area) from an image based on the image signal. This detection process is performed using for example the inter-frame difference processing or the background difference processing described above. In this case, the information on the object area is for example the size, position, traveling velocity, color and the like of the object area. For example, the traveling velocity is composed of a horizontal component and a vertical component. A left and a right and an upward direction and a downward direction are distinguished from each other by a plus sign and a minus sign.

The object area information storing unit 112 stores the information on the current object area which information is detected by the object area detecting unit 111. The object area detecting unit 111 detects object area information in correspondence with each frame of the image signal. The past object area information storing unit 113 stores information on a past object area.

In this case, past object area information includes object area information detected by the object area detecting unit 111 in a frame immediately preceding a current frame and object area information reproduced in the frame immediately preceding the current frame. Incidentally, contents of the object area information stored in the past object area information storing unit 113 are contents of the object area information stored in the above-described object area information storing unit 112 and an identifying number as identifying information added to the contents of the object area information stored in the object area information storing unit 112.

The object area associating unit 114 associates the current object area and the past object area with each other on the basis of the information on the current object area which information is stored in the information storing unit 112 and the information on the past object area which information is stored in the information storing unit 113. This association is performed using the information (size, position, traveling velocity and the like) on the current object area and predictive information on the current object area, the predictive information on the current object area being based on the information (size, position, traveling velocity and the like) on the past object area.

The size, the traveling velocity and the like forming the information on the past object area become predicted values of the size, the traveling velocity and the like of the current object area as they are. The position forming the information on the past object area is converted into a predicted value of the position of the current object area, using the traveling velocity and the like.

The object area associating unit 114 associates each past object area with a current object area having information closest to predictive information on the current object area, the predictive information being obtained on the basis of information on the past object area.

Depending on the number of current object areas detected by the object area detecting unit 111, all past object areas may not be associated with current object areas. This means that a past object area that cannot be associated has disappeared.

Depending on the number of current object areas detected by the object area detecting unit 111, a current object area remains after all past object areas are associated with current object areas. This means that the remaining current object area has appeared as a new object area.

The disappeared object area reproducing unit 116 reproduces and outputs information on a past object area that cannot be associated by the object area associating unit 114 as described above. In this case, as the reproduced object area information, the above-described predictive information is basically used. As for an identifying number, a positive value is converted into a negative value. Incidentally, object area information including an identifying number that is already a negative value has been reproduced in the previous frame.

Incidentally, in this case, by reproducing information on a predetermined object area that has disappeared, an identifying number given to the predetermined object area continues being retained. In the present embodiment, the retention of the identifying number is stopped on certain conditions.

For example, as described above, the object area associating unit 114 uses predictive information on a current object area which information is based on information on a past object area. However, in a case where a predicted position is outside an image, even when object area information is to be reproduced by the reproducing unit 116, the object area information is not reproduced.

In addition, for example, in a case where the number of times of reproduction of object area information including an identifying number that is already a negative value exceeds a predetermined number of frames, even when the object area information is to be reproduced by the reproducing unit 116, the object area information is not reproduced. This case means that the predetermined object area that has disappeared has not reappeared at a predicted position within a period corresponding to the predetermined number of frames. The predetermined number of frames may be set as a fixed value, or may be set according to the number of frames in which the predetermined object area existed before the disappearance thereof.

Thus, by stopping reproduction in the disappeared object area reproducing unit 116 and hence retention of an identifying number on certain conditions, a need for a process of for example predicting a reappearance position of a predetermined object area corresponding to the identifying number is eliminated, so that a processing load can be reduced.

The object area determining unit 115 adds an identifying number included in the information on the past object area associated with the current object area by the object area associating unit 114 as described above to the information on the associated current object area. The object area determining unit 115 then outputs the object area information. In this case, when the identifying number is a negative value, the negative value is converted to a positive value. This means that the object area that once disappeared has reappeared.

In addition, the object area determining unit 115 adds a new identifying number to information on the current object area that remains without being associated with a past object area by the object area associating unit 114 as described above, and then the object area determining unit 115 outputs the object area information. This means that the new object area that did not exist in the past has appeared.

Further, the object area determining unit 115 determines whether information such as size or the like of the current object area associated with the past object area is changed greatly as compared with that of the past object area. When the information of the current object area is changed greatly, the information on the associated past object area is reproduced and output. In this case, as the reproduced object area information, the above-described predictive information is basically used. As for an identifying number, a positive value is converted into a negative value.

When the information such as the size or the like of the current object area associated with the past object area is thus changed greatly as compared with that of the past object area, it is expected that in a next frame in which the current object area becomes a past object area, the current object area will not be correctly associated with a current object area to be detected in the next frame. That is, in this case, although the past object area is tentatively associated with the current object area, in the present embodiment, the object area is also considered to have substantially disappeared, and the same process as in the disappeared object area reproducing unit 116 described above is performed.

The object area information integrating unit 117 integrates the object area information output from the disappeared object area reproducing unit 116 and the object area determining unit 115. The object area information integrating unit 117 outputs only object area information having positive identifying numbers as a result for the current frame. In addition, the object area information integrating unit 117 sends the object area information having positive and negative identifying numbers as past object area information to be used in a next frame to the information storing unit 113.

The operation of the image processing unit shown in FIG. 2 will be described. An image signal (input image signal) obtained by image pickup by the camera 101 is supplied to the object area detecting unit 111. The detecting unit 111 detects information (size, position, traveling velocity and the like) on an object area (current object area) from an image obtained from the input image signal on the basis of the input image signal, using inter-frame difference processing, background difference processing or the like. The information on the current object area which information is thus detected by the detecting unit 111 is supplied to the object area information storing unit 112 to be stored in the object area information storing unit 112.

The information on the current object area which information is stored in the information storing unit 112 is supplied to the object area associating unit 114. In addition, the object area associating unit 114 is supplied with information (size, position, traveling velocity, identifying number and the like) on a past object area which information is stored in the past object area information storing unit 113.

The object area associating unit 114 associates the current object area and the past object area with each other on the basis of the information on the current object area and the information on the past object area. This association is performed using the information (size, position, traveling velocity and the like) on the current object area and predictive information on the current object area, the predictive information on the current object area being based on the information (size, position, traveling velocity and the like) on the past object area.

In this case, each past object area is associated with a current object area having information closest to predictive information on the current object area, the predictive information on the current object area being obtained on the basis of information on the past object area. However, depending on the number of current object areas detected by the object area detecting unit 111, there is a case (1) where all past object areas cannot be associated with current object areas or a case (2) where a current object area remains without being associated with a past object area. The case (1) means that there is an object area that has disappeared. The case (2) means that there is an object area that has appeared as a new object area.

The disappeared object area reproducing unit 116 refers to a result of the association by the object area associating unit 114. The disappeared object area reproducing unit 116 reproduces and outputs information on a past object area that cannot be associated. In this case, as the reproduced object area information, the above-described predictive information is basically used. As for identifying numbers, an identifying number that is a positive value is converted into a negative value, and an identifying number that is already a negative value remains as it is, indicating that the object area information including the identifying numbers results from reproduction.

The reproducing unit 116 thus reproduces information on a predetermined object area that has disappeared, whereby identifying information given to the predetermined object area continues being retained. However, the retention of the identifying number is stopped on certain conditions (a predicted position is outside an image, and the number of times of reproduction exceeds a predetermined number of frames, for example) as described above, so that a processing load is reduced.

The object area determining unit 115 refers to the result of the association by the object area associating unit 114. The object area determining unit 115 adds an identifying number included in the information on the past object area associated with the current object area to the information on the associated current object area. The object area determining unit 115 then outputs the object area information. In this case, when the identifying number is a negative value, the negative value is converted to a positive value. This means that the object area that once disappeared has reappeared.

In addition, referring to the result of the association by the object area associating unit 114, the object area determining unit 115 adds a new identifying number to information on the current object area that remains without being associated with a past object area, and then the object area determining unit 115 outputs the object area information. This means that the new object area that did not exist in the past has appeared.

Further, the object area determining unit 115 determines whether information such as size or the like of the current object area associated with the past object area is changed greatly as compared with that of the past object area. When the information of the current object area is changed greatly, the information on the associated past object area is reproduced and output. In this case, as the reproduced object area information, the above-described predictive information is basically used. As for an identifying number, a positive value is converted into a negative value to indicate the reproduction.

The object area information output from the reproducing unit 116 and the determining unit 115 is supplied to the object area information integrating unit 117, and then integrated. That is, the information integrating unit 117 outputs only object area information having positive identifying numbers as a result for the current frame. The object area information having the positive identifying numbers is supplied to the recording device 102 to be stored therein, as described above. In addition, the object area information having positive and negative identifying numbers is sent from the object area information integrating unit 117 to the information storing unit 113 to be stored in the information storing unit 113 as past object area information to be used in a next frame.

Figure 8:
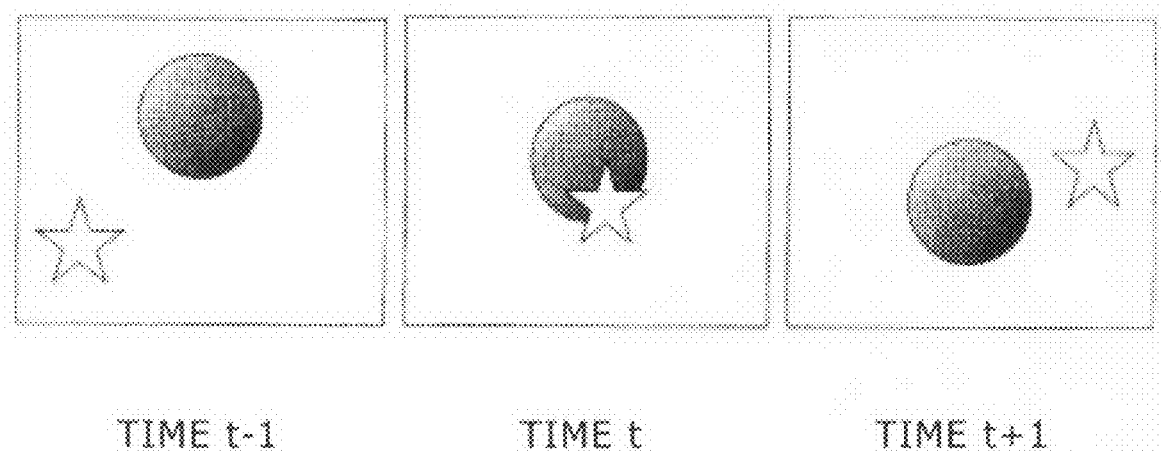
FIG. 8 is a diagram showing an example in which two objects to be tracked in an object tracking process overlap each other.
Figure 9:
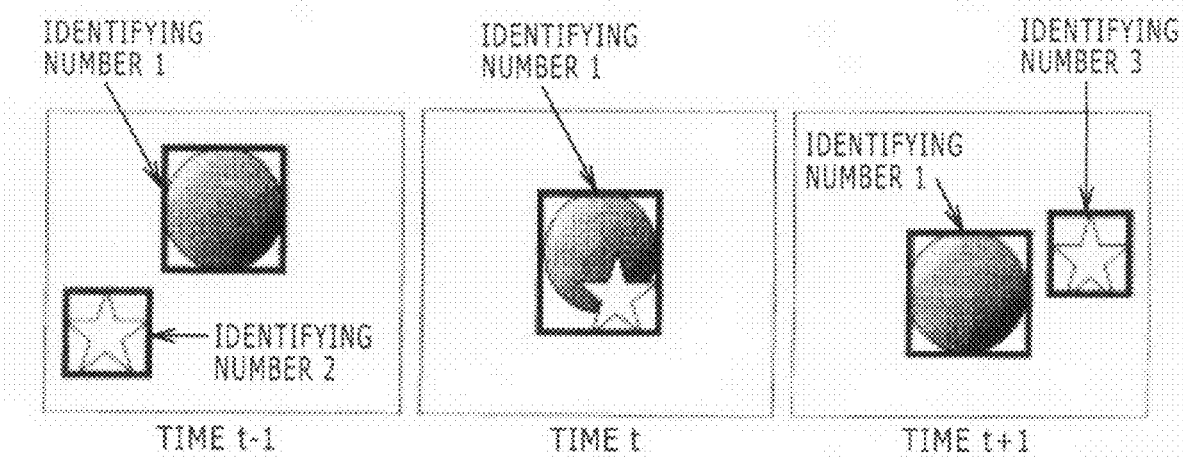
FIG. 9 is a diagram showing an example of giving identifying numbers according to a conventional method when the two objects overlap each other.

Description will next be made of an example of continued retention and restoration of an identifying number in the image processing unit shown in FIG. 2. First, consideration will be given to a case where two objects at a time t−1 overlap each other at time t, and are separate from each other again at time t+1, as shown in FIG. 8 described above. This is a phenomenon that occurs in an actual image monitoring system when people overlap each other.

Figure 3:
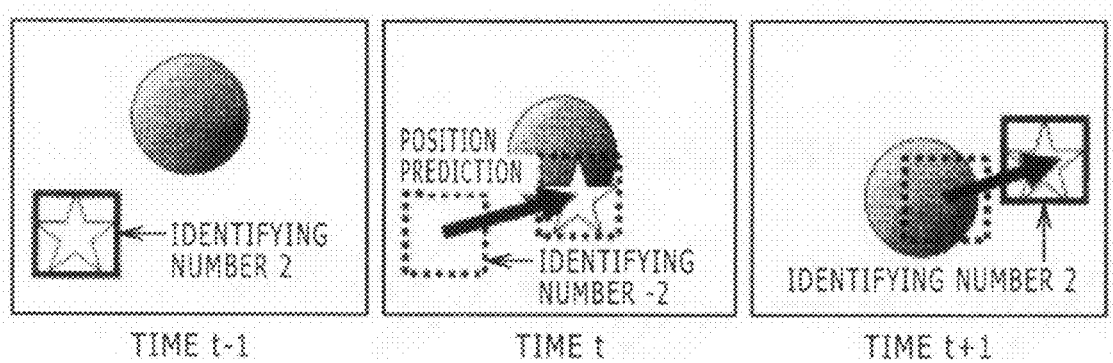
FIG. 3 is a diagram showing an example (two objects overlap each other) of continued retention and restoration of an identifying number in an object area tracking process.
Figure 4:
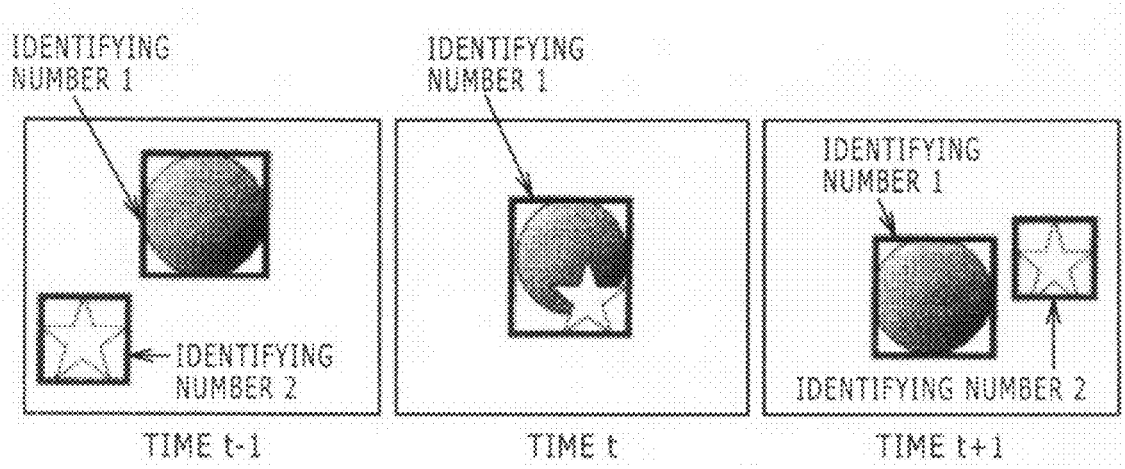
FIG. 4 is a diagram showing an example of giving identifying numbers when the continued retention of the identifying number is performed.

Description will be made with reference to FIG. 3 and FIG. 4. At time t, there is only one object area. When this object area is associated with an object area at time t−1, the object area is associated with an object area having an identifying number "1" at time t−1. An object area having an identifying number "2" at time t−1 is not associated with any object area and is thus in a disappeared state at time t. In this case, information on the disappeared object area is reproduced, and the identifying number is changed from "2" as a positive value to "−2" as a negative value. Thereby the identifying number of the disappeared object area continues being retained.

At time t+1, whether there is an object area that can be associated with the object area having the identifying number "−2" is determined using predictive information (size, position, traveling velocity and the like) on the object area at time t+1, the predictive information being obtained from the information reproduced at time t on the object area having the identifying number "−2". When there is an object area that can be associated at time t+1, the object area is associated, and the identifying number "2" is added to information on the object area. Thereby, when the object area that disappeared temporarily due to the overlapping of objects reappears, the same identifying number as that before the disappearance of the object area is given to the object area. Thus an identical identifying number can be maintained for an identical object area.

Incidentally, while the above description has been made of a case where an object area overlaps another object area and thereby disappears temporarily, similar operation is performed when an object is completely hidden behind an obstacle and thus disappears temporarily.

Figure 10:
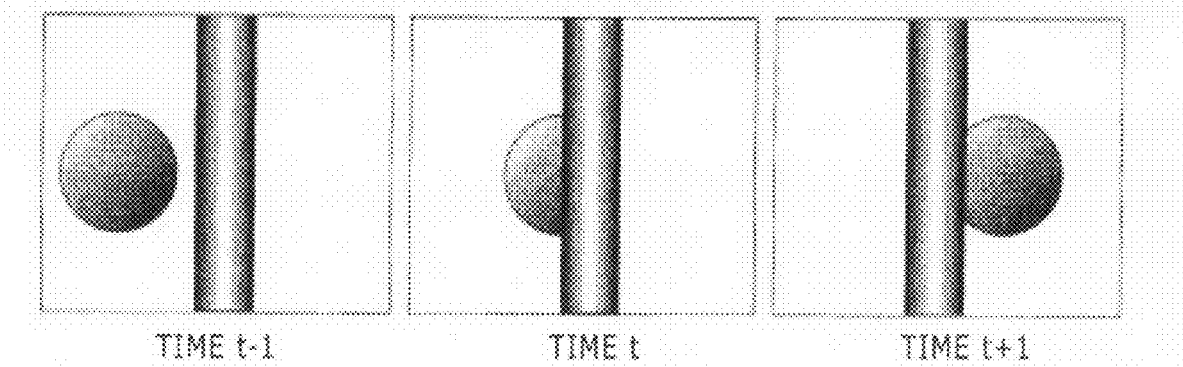
FIG. 10 is a diagram showing an example in which an object to be tracked in the object tracking process is hidden.
Figure 11:
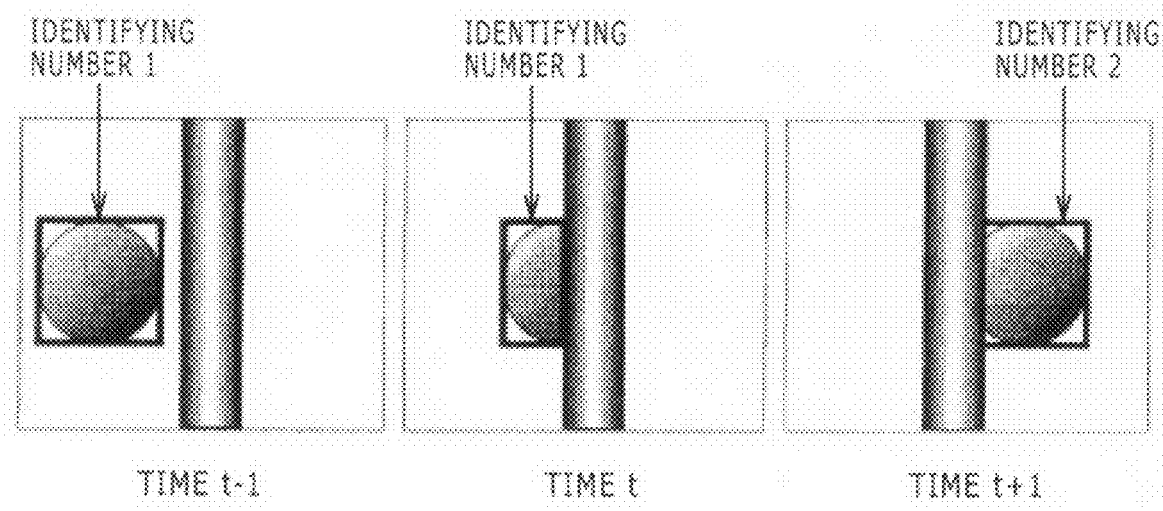
FIG. 11 is a diagram showing an example of giving identifying numbers according to the conventional method when the object is hidden.

Consideration will next be given to a case where an object at time t−1 is hidden by another object at time t, and reappears at time t+1, as shown in FIG. 10 described above. This is a phenomenon that occurs in an actual image monitoring system when a person is hidden behind an obstacle (for example a utility pole) or the like.

Figure 5:
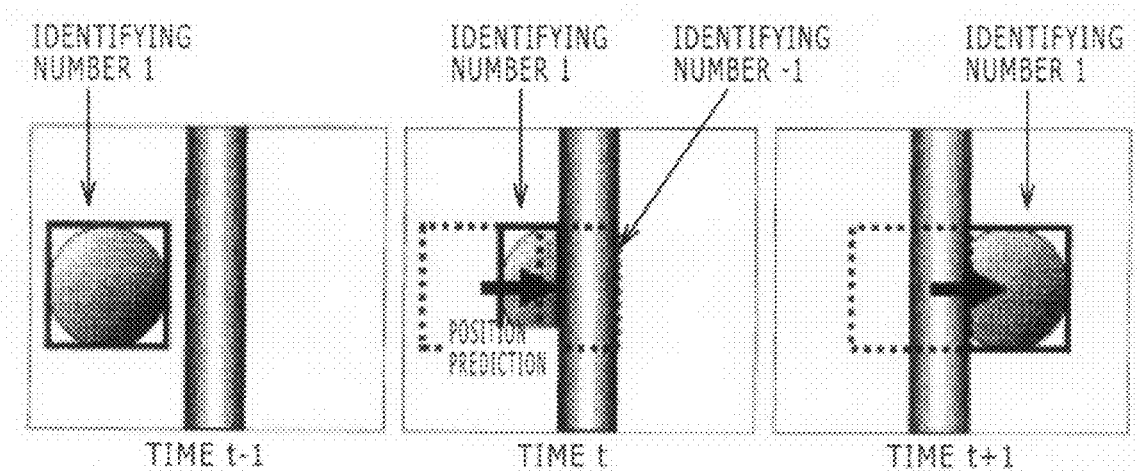
FIG. 5 is a diagram showing an example (an object is hidden) of continued retention and restoration of an identifying number in the object area tracking process.
Figure 6:
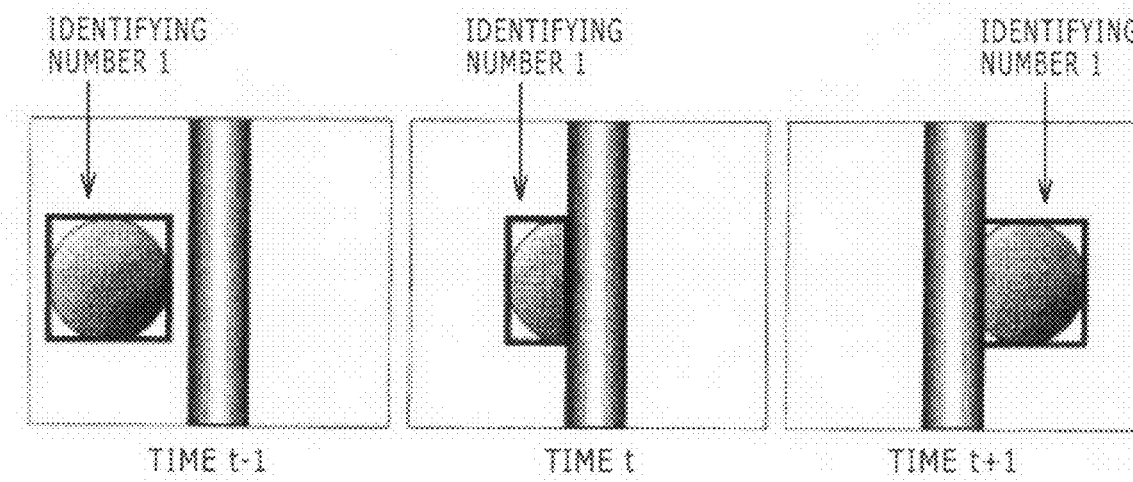
FIG. 6 is a diagram showing an example of giving identifying numbers when the continued retention of the identifying number is performed.
Figure 7:
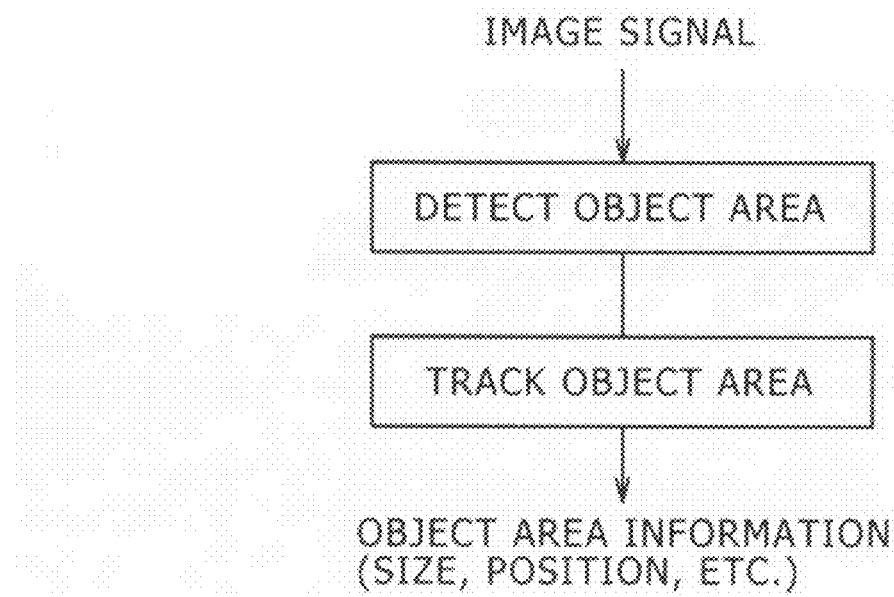
FIG. 7 is a diagram showing a flow of an object detecting process.

Description will be made with reference to FIG. 5 and FIG. 6. At time t, there is only one object area. This object area is associated with an object area having an identifying number "1" at time t−1. In this case, however, because the object area at time t is hidden behind an obstacle, the size of the object area is changed greatly as compared with that of the object area at time t−1. Thus, further, information on the object area having the identifying number "1" at time t−1 is reproduced at time t. In this case, the identifying number is changed from "1" as a positive value to "−1" as a negative value.

In this case, because the size of the object area having the identifying number "1" at time t is changed greatly from the original size, it is expected that the object area having the identifying number "1" at time t will not be correctly associated with an object area at a next time t+1. That is, the reproduction is performed as described above because the object area having the identifying number "1" at time t−1 is considered to substantially disappear at time t.

At time t+1, whether there is an object area that can be associated with the object area at time t (the identifying number "1" and the identifying number "−1") is determined using predictive information (size, position, traveling velocity and the like) on the object area at time t+1, the predictive information being obtained from information on the object area at time t. In this case, from relation in size, an object area that goes out of the hiding obstacle and reappears at time t+1 is associated with the object area having the identifying number "−1" at time t, and the identifying number "1" is added to information on the object area that reappears at time t+1. Thereby, when the object area that disappeared temporarily due to the hiding of an object reappears, the same identifying number as that before the disappearance of the object area is given to the object area. Thus an identical identifying number can be maintained for an identical object area.

As described above, according to the image monitoring system 100 shown in FIG. 1, in the object area tracking process, an identifying number given to a predetermined object area that disappeared continues being retained. When the predetermined object area reappears, the retained identifying number is given to the predetermined object area. Even when the object area temporarily disappears because the object area is overlapped or hidden, the identifying number can be maintained. Therefore object tracking performance can be improved.

In addition, according to the image monitoring system 100 shown in FIG. 1, in the object area tracking process, when a predetermined object area disappears, information such for example as a size, position and the like on the predetermined object area when the predetermined object area reappears is predicted on the basis of information on a past object area associated with the predetermined object area. Whether the predetermined object area has reappeared is determined referring to the predicted object area information. It is thus possible to determine the reappearance of the predetermined object area with high accuracy, and improve accuracy in maintenance of identifying numbers.

Incidentally, in the process of the image processing unit in the foregoing embodiment, when information on an object area that has disappeared is reproduced, an identifying number included in the information is changed from a positive value to a negative value. However, the present invention is not limited to this. The identifying number can be changed to any form as long as the object area information can be recognized as reproduced information and the original identifying number can be restored.

In addition, while the foregoing embodiment uses identifying numbers as unique identifying information, other information may be used.

According to an embodiment of the present invention, even when an object area temporarily disappears because the object area is overlapped or hidden, the identifying number can be maintained. Therefore object tracking performance can be improved. The present invention is applicable to monitoring systems using ITV cameras, for example.

It should be understood by those skilled in the art that various modifications, combinations, sub-combinations and alterations may occur depending on design requirements and other factors insofar as they are within the scope of the appended claims or the equivalents thereof.

The invention claimed is:

1. An image monitoring system comprising:
  an object area detection processing section that detects object area information from an image obtained by an input image signal on a basis of the input image signal; and
  an object area tracking processing section that performs object area tracking processing by associating a current object area with a past object area on a basis of the object area information detected by said object area detection processing section;
  wherein said object area tracking processing section associates said current object area with said past object area using unique identifying information, and
  said object area tracking processing section continues retaining identifying information given to a predetermined object area that has disappeared, and gives the retained identifying information to the predetermined object area when the predetermined object area reappears, and wherein said object tracking processing section discontinues retaining identifying information as a function of a pre-determined number of frames, said pre-determined number of frames corresponding to a number of frames in which the predetermined object area existed before it disappeared.

2. The image monitoring system according to claim 1, wherein said object area tracking processing section reproduces information on said predetermined object area that has disappeared in order to continue retaining the identifying information given to said predetermined object area that has disappeared.

3. The image monitoring system according to claim 1, wherein said object area tracking processing section predicts object area information when said predetermined object area reappears on a basis of information on a past object area associated with said predetermined object area that has disappeared, and determines whether said predetermined object area has reappeared, referring to the predicted object area information.

4. The image monitoring system according to claim 1, wherein said object area tracking processing section determines that said predetermined object area has disappeared when said object area detection processing section does not detect information on said predetermined object area.

5. The image monitoring system according to claim 1, wherein said object area tracking processing section determines that said predetermined object area has disappeared when said object area detection processing section detects information on said predetermined object area but the detected information on said predetermined object area is changed with respect to information on a past object area associated with said predetermined object area.

6. The image monitoring system according to claim 1, wherein said object area tracking processing section predicts a position where said predetermined object area reappears on a basis of information on a past object area associated with said predetermined object area for each frame, and stops retention of the identifying information given to said predetermined object area when the predicted position is outside the image.

7. The image monitoring system according to claim 1, wherein said object area tracking processing section predicts a position where said predetermined object area reappears on a basis of information on a past object area associated with said predetermined object area for each frame, and stops retention of the identifying information given to said predetermined object area when said predetermined object area has not reappeared at the predicted position within a period corresponding to a predetermined number of frames.

8. An object area tracking method for detecting object area information from an image obtained by an input image signal on a basis of the input image signal, and performing object area tracking processing by associating a current object area with a past object area on a basis of the detected object area information, said object area tracking method comprising:
  associating, by a processor, said current object area with said past object area using unique identifying information; and
  continuing retaining identifying information given to a predetermined object area that has disappeared, and giving, with the processor, the retained identifying information to the predetermined object area when the predetermined object area reappears, and discontinuing retaining identifying information as a function of a pre-determined number of frames, said pre-determined number of frames corresponding to a number of frames in which the predetermined object area existed before it disappeared.

* * * * *